United States Patent
Hamza et al.

(10) Patent No.: US 9,016,303 B2
(45) Date of Patent: Apr. 28, 2015

(54) AUTOMATIC AIR EVACUATION APPRATUS FOR SWIMMING POOL AND SPA FILTERS

(75) Inventors: Hassan Hamza, Simi Valley, CA (US); Garrett James Burkitt, III, Simi Valley, CA (US)

(73) Assignee: Vaccare, LLC, Canoga Park, CA (US)

( * ) Notice: Subject to any disclaimer, the term of this patent is extended or adjusted under 35 U.S.C. 154(b) by 402 days.

(21) Appl. No.: 13/483,051

(22) Filed: May 30, 2012

(65) Prior Publication Data
US 2013/0319548 A1 Dec. 5, 2013

(51) Int. Cl.
*F16K 15/04* (2006.01)
*B01D 36/00* (2006.01)
*F16K 24/04* (2006.01)

(52) U.S. Cl.
CPC .............. *F16K 15/04* (2013.01); *B01D 36/001* (2013.01); *F16K 24/046* (2013.01)

(58) Field of Classification Search
CPC ...... F16K 15/04; F16K 24/046; B01D 36/001
USPC ......... 137/199, 198, 202, 587, 589; 4/209 FF
See application file for complete search history.

(56) References Cited

U.S. PATENT DOCUMENTS

| | | | |
|---|---|---|---|
| 2,111,473 A * | 3/1938 | Hudson | 137/202 |
| 3,315,808 A | 4/1967 | Hopkins | |
| 4,778,595 A * | 10/1988 | Sable et al. | 210/119 |
| 4,844,414 A * | 7/1989 | Sable et al. | 251/319 |
| 4,901,754 A * | 2/1990 | Sable et al. | 137/433 |
| 5,435,339 A | 7/1995 | Hayes | |
| 6,481,455 B2 * | 11/2002 | Gustafson et al. | 137/173 |
| 6,540,909 B2 | 4/2003 | Smith | |
| 6,957,742 B1 | 10/2005 | Pillart | |
| 7,159,731 B2 | 1/2007 | Kai | |
| 8,137,545 B2 * | 3/2012 | Nibler et al. | 210/167.12 |
| 8,173,011 B2 * | 5/2012 | Nibler et al. | 210/167.11 |
| 2007/0187306 A1 * | 8/2007 | Pecca | 210/120 |

* cited by examiner

Primary Examiner — Craig Schneider
Assistant Examiner — Nicole Wentlandt
(74) Attorney, Agent, or Firm — Louis F. Teran

(57) ABSTRACT

The present invention is an air evacuation apparatus that prevents the accumulation of air inside a swimming pool or spa filter by allowing any air to be removed from inside the filter every time the swimming pool pump is turned on. By allowing air to be removed from the filter, the present invention prevents the build-up of dangerous levels of potential energy caused by compressed air inside the filter that can lead to the violent separation of the filter. More important, the air evacuation apparatus of the present invention allows air to be safely and automatically removed from inside of the filter without interfering with the functionality of the filter.

3 Claims, 16 Drawing Sheets

AUTOMATIC AIR EVACUATION APPRATUS FOR SWIMMING POOL AND SPA FILTERS

FIELD OF INVENTION

The present invention relates to an air purge valve for use with a swimming pool or spa filter. More particularly, to air evacuation devices that prevent the accumulation of air inside a swimming pool and spa filter as it is pressurized.

DESCRIPTION OF PRIOR ART

A swimming pool or simply a pool is a container filled with water intended for swimming or water-based recreation. A swimming pool can be built of various sizes and either above or in the ground. A swimming pool may be for public or private use. Private swimming pools are mostly built in private residences and used for recreation and relaxation by adults, children, and even infants. Public pools are mostly built in hotels, schools, fitness centers, and parks. Public pools are mostly used for fitness, water sports, and training by people of all ages, including elderly and young children.

Swimming pools are designed to be large containers of water with a drain, inlet connections, and a water recirculation system. The water recirculation system is driven by a large water pump that extracts water from the pool through the drain. The water that is extracted from the pool is passed through a debris collection trap and a skimmer to remove large debris such as leaves and branches. The water is then pumped into a large filter to remove other contaminants. Finally the filtered water is pumped back into the swimming pool through the inlet connections that are typically located around the interior wall of the pool.

The recirculation system of a swimming pool is pressurized so that water from the swimming pool can be sucked in through the drain and filtered water can be pushed out into the swimming pool through the inlet connections. The pressurized recirculation system allows the water to maintain a constant flow that circulates the water through the filter.

The filters used in swimming pools are large pressure vessels designed to operate safely over a predetermined pressure range. The filters are designed to withstand the high internal pressure caused by a large volume of compressed water. However, under certain circumstances, air can inadvertently find its way into the filter. Air entrapped inside the swimming pool filter is also compressed along with the water. But, the compressibility of air is substantially greater than the compressibility of water. Thus, compressed air inside a swimming pool filter presents a potential safety hazard because it has sufficient potential energy to cause the filter to separate violently.

A swimming pool filter is typically designed as a tank with two halves held together by a variety of fastening methods, primarily a clamp. The greatest risk occurs when air is entrapped inside the filter and the two halves of the filter are not properly clamped together. Under this scenario, the compressed air can cause a violent separation of the filter halves. Such violent separation can shoot the top half of the filter straight up in the air with substantial force and can cause serious injury or even death.

Servicing of swimming pool filters is required periodically every month. Servicing entails the separation of the two halves of the filter to clean the filter cartridge or other filter medium. Prior to separating the filter halves, a manual relief valve is opened to facilitate the drainage of water from inside the tank. After servicing the filter, the clamp is used to reattach the two halves together. Then the pool pump is started to pump water into the filter until it is full. As the water is pumped into the filter, the manual relief valve is left open to allow the air inside the filter to be pushed out completely. When the manual relief valve begins to squirt or leak water, it indicates that the filter is full of water and the air has been evacuated. At this point, the manual relief valve is closed to pressurize the filter until it is ready for use. This process is routinely conducted without any problems.

However, on certain occasions the clamp is not properly reassembled or secured to hold together the two halves of the filter. In addition, the air inside the filter is not fully removed or air bleeds into the filter through a leak in the piping of the swimming pool's recirculation system. As the filter is pressurized, any air entrapped inside is compressed. Thus, the compressed air increases the potential energy inside the filter to dangerous levels. Then, when the improperly reassembled clamp allows the top half of the filter to be slightly displaced, the built-up potential energy is unleashed instantly resulting in a violent separation of the filter that shoots the top half straight up at a high rate of velocity.

The dangerous levels are not necessarily reached immediately after servicing the filter. It can take some time for sufficient air to bleed and be entrapped inside the filter. As such, the most common method to deal with this problem is to require the operator of the swimming pool to periodically open the manual relief valve to bleed out any air trapped inside the filter. Additionally, the entire filter, especially the clamp, must be inspected periodically. In all, this is a manual inspection process that is cumbersome and not always performed. Nevertheless, most swimming pool owners or operators rely on the use of a manual relief valve to periodically remove any air trapped inside the filter. Such manual relief valves are taught by U.S. Pat. Nos. 5,435,339 and 7,159,731.

Many manufacturers of swimming pool filters incorporate a hollow tube extending down from the highest point inside the filter. The main purpose of the hollow tube is to continuously evacuate any entrapped air without opening the manual relief valve. As air is entrapped inside the filter, the internal pressure will push the air to the highest point inside the filter. Subsequently, the air will be pushed into the hollow tube. Ultimately the entrapped air is removed from inside the filter by being pushed down the hollow tube until it exits the interior of the filter. The use of the hollow tube has been proven to be effective in situations where the volume of entrapped air is not substantial. However, a substantial volume of entrapped air cannot be evacuated through the hollow tube fast enough to prevent the violent separation of the filter. The rate at which the entrapped air is evacuated through the hollow tube is dependent on the inside diameter of the hollow tube itself. Thus, the hollow tube is not effective in dire situations where the volume of entrapped air is substantial and the build-up of potential energy is at dangerous levels.

Automatic pressure relief valves that open when the internal pressure is above a predetermined level have not been widely adopted in the swimming pool market because they have not been reliable or accurate in preventing the violent separation of filters. The top half of the filter does not necessarily separate or shoot up into the air due to an elevated internal pressure. The problem occurs when compressed air is entrapped inside the filter and the halves of the filter are not properly clamped together. Thus, the internal pressure may be within a safe range despite the presence of compressed air inside the filter. But, despite a normal level of internal pressure in the filter, the potential energy of the compressed air can be violently unleashed when the halves of the filter are displaced slightly due to the improperly assembled clamp. By comparison, if there is no compressed air inside the filter, then the slight displacement of the filter halves would only result in a large volume of water squirting out even when the internal pressure is above safe levels. In essence, the potential energy of compressed water is not sufficient to launch the top half of the filter as a trajectory. Accordingly, this problem may occur despite the internal pressure of the filter being within a safe range. Thus, an automatic relief valve that activates solely by the internal pressure of the filter would not prevent this dangerous separation of the filter from occurring.

What is needed is a device that will allow air inside a filter to automatically bleed out regardless of the internal pressure of the filter. Unless this and other practical problems associated with swimming pool filters are resolved, the risk of people continuing to be injured and property continuing to be damaged by the violent separation of filters will persist and an effective safety device will fail to be realized.

SUMMARY OF THE INVENTION

Accordingly, the present invention has been made in view of the above-mentioned disadvantages occurring in the prior art. The present invention is an air evacuation apparatus that prevents the accumulation of air inside a swimming pool filter by allowing any air to be removed from inside the filter every time the swimming pool pump is turned on. By allowing air to be removed from the filter, the present invention prevents the build-up of dangerous levels of potential energy caused by compressed air inside the filter that can lead to the violent separation of the filter.

It is therefore a primary object of the present invention to safely and automatically remove all of the air inside a swimming pool filter before the internal pressure of the filter is raised and the water therein is compressed.

Another object of the present invention is to prevent the build-up of compressed air inside a swimming pool filter, thus preventing high levels of potential energy that can be unleashed instantly causing the violent separation of the filter.

Yet another object of the present invention is to provide an air evacuation apparatus that can be used to retrofit existing swimming pool filters without the need of special tools or a professional retrofitter.

A still further object of the present invention is to provide an air evacuation apparatus that is inexpensive and can be installed directly to an opening already existing in swimming pool filters without the need of special tools or a professional installer. The object is to eliminate the need to create new holes in a filter.

A yet further object of the present invention is to provide an air evacuation apparatus that can be exposed to the dirty unfiltered water inside the filter and still be effective at releasing the air that is entrapped inside.

A yet another object of the present invention is to provide an air evacuation apparatus that can be cleaned easily and quickly without the need of special tools or a professional cleaner.

A final object of the present invention is to provide an air evacuation apparatus that can be manufactured in a cost effective manner and using plastic material to prevent corrosion.

The above objects and other features and advantages of the present invention, as well as the structure and operation of various embodiments of the present invention, are described in detail below with reference to the accompanying drawings.

DESCRIPTION OF THE DRAWINGS

The accompanying drawings which are incorporated by reference herein and form part of the specification, illustrate various embodiments of the present invention and, together with the description, further serve to explain the principles of the invention and to enable a person skilled in the pertinent art to make and use the invention. In the drawings, like reference numbers indicate identical or functional similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
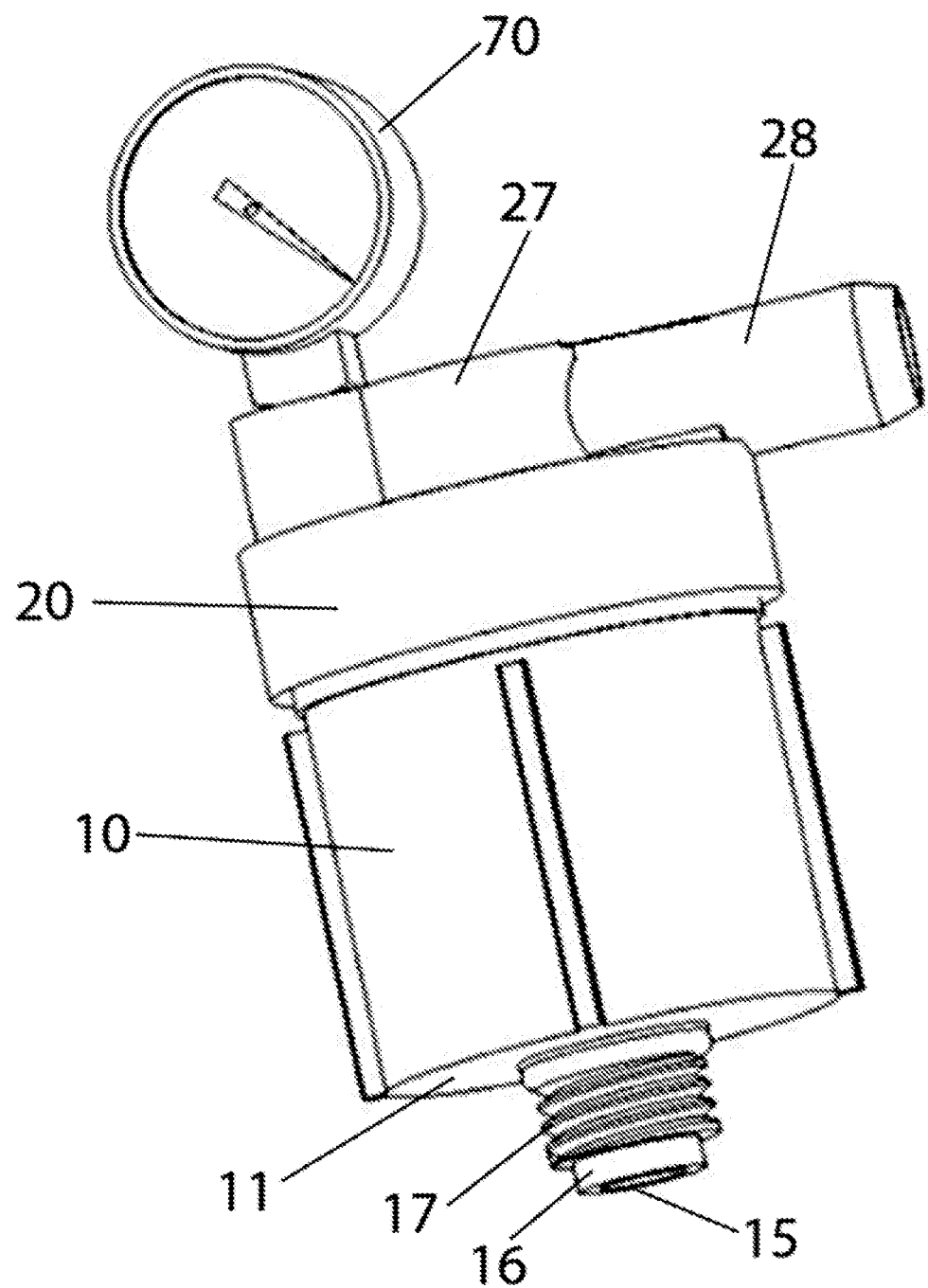
FIG. 1 is a perspective view of the air evacuation apparatus of the present invention in its assembled state as it would be installed into a swimming pool filter.

Reference will now be made to the drawings in which various elements of the present invention will be given numerical designations and in which the invention will be discussed so as to enable one skilled in the art to make and use the present invention.

The present invention comprises an air evacuation apparatus 100 that attaches to an opening 210 located on the top of a swimming pool filter 200 and having a valve body 10, a top cover 20, a upper ball shield 30, a ball retainer 40, a lower ball 50, an upper ball 60, and a pressure gauge 70. It is well known that swimming pool filters 200 are large pressure vessels filled with compressed water. Under certain circumstances, compressed air can be entrapped inside the swimming pool filter 200 causing a risk of a violent separation of the swimming pool filter 200. The air evacuation apparatus 100 of the present invention allows air to be safely and automatically removed from inside of the filter 200 without interfering with the functionality of the filter 200.

Figure 2:
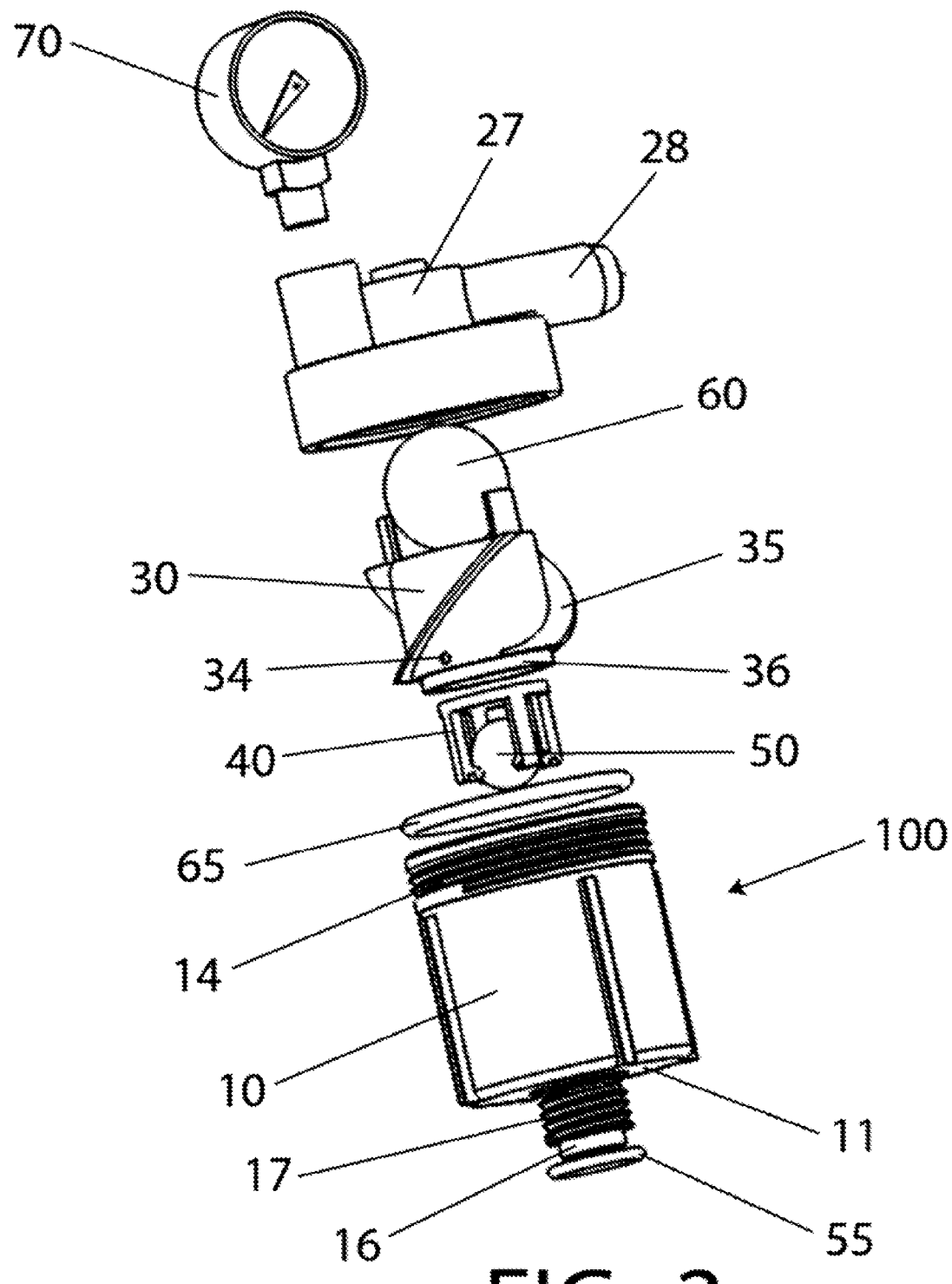
FIG. 2 is an exploded view of the air evacuation apparatus of the present invention.

FIG. 1 shows a perspective view of the air evacuation apparatus 100 of the present invention in its assembled state as it would be installed into the swimming pool filter 200. FIG. 2 shows an exploded view of the air evacuation apparatus 100 of the present invention to depict in greater detail the various components that comprise the air evacuation apparatus 100. The main component of the present invention is the valve body 10 that attaches to the top of the swimming pool filter 200.

Figure 3A:
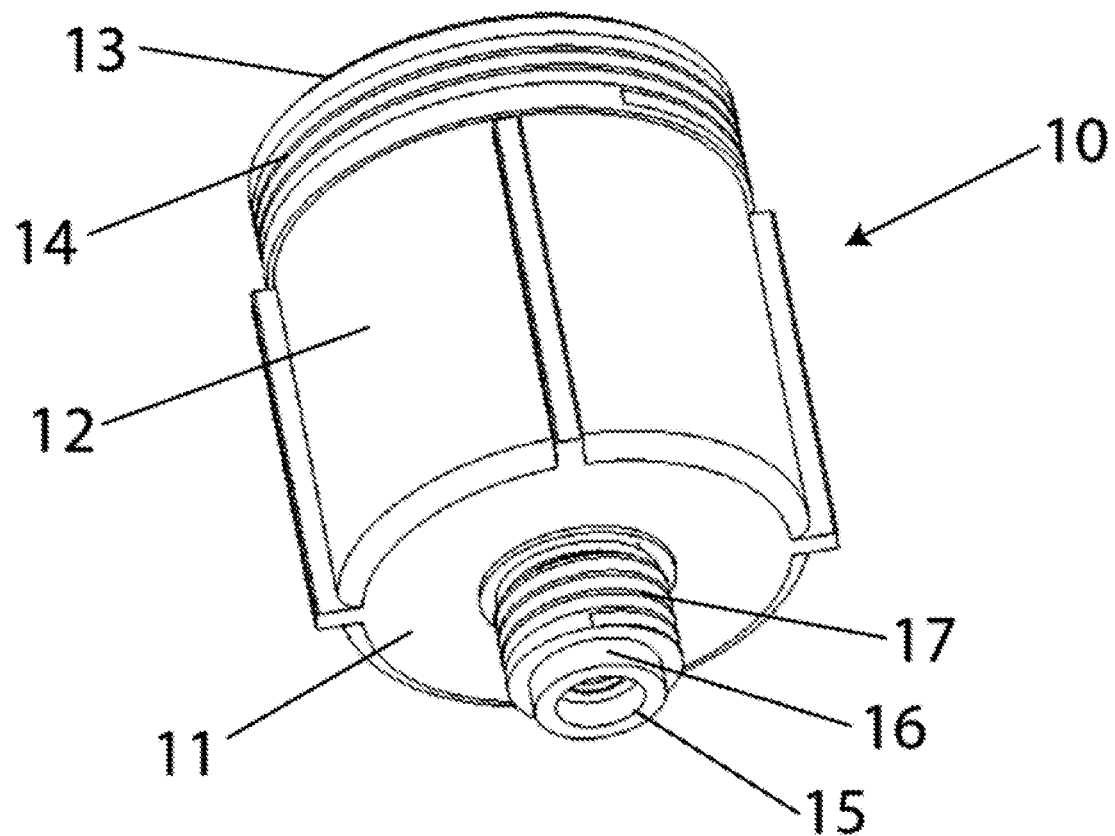
FIG. 3a anti 3b is a perspective view of the valve body of the present invention.
Figure 3B:
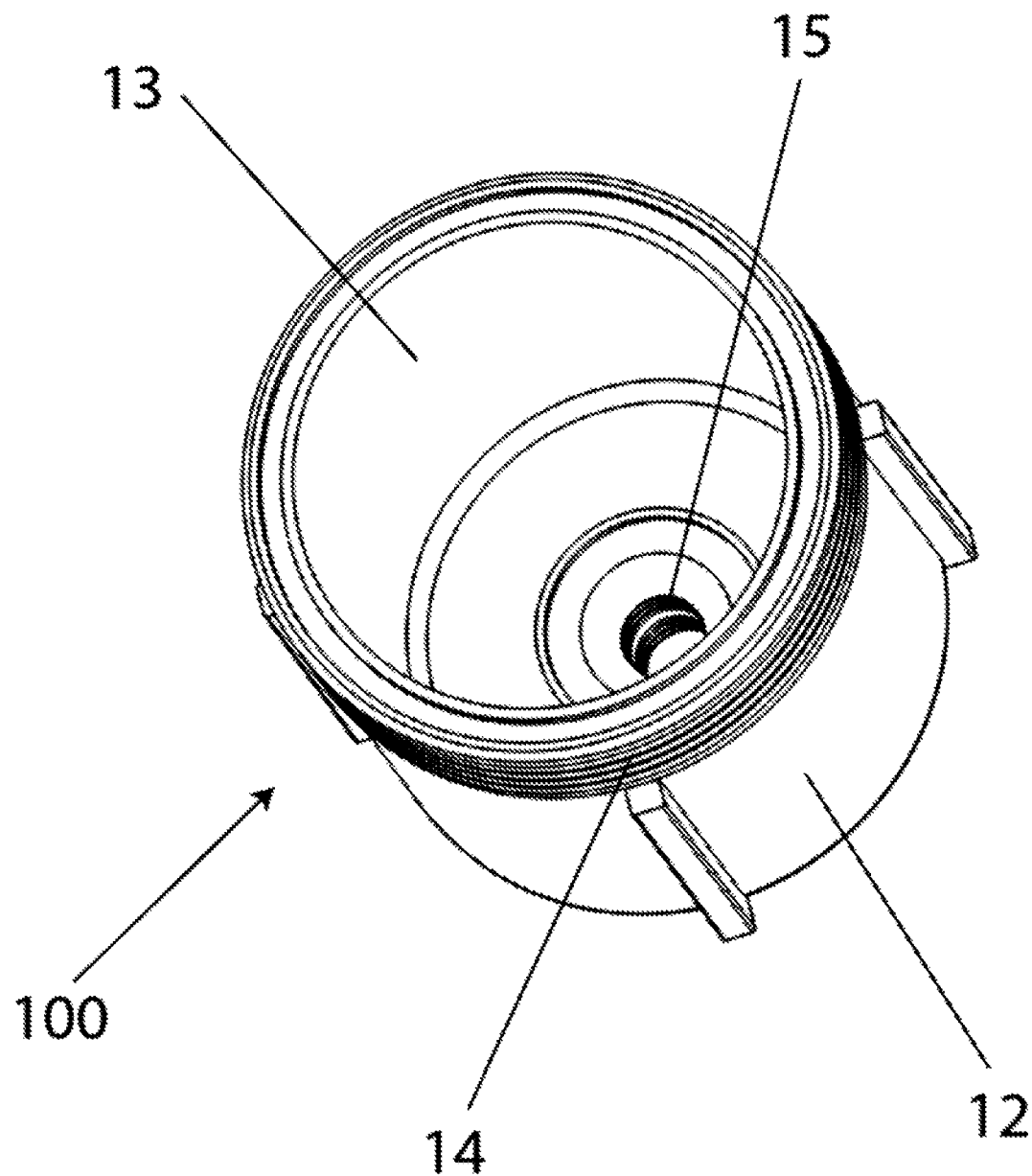

As shown in FIGS. 3a and 3b, the valve body 10 has a bottom plate 11 from which an annular sidewall 12 extends upwardly to define an upwardly open cavity 13. The top end of the annular sidewall 12 has top external threads 14 to which the top cover 20 is attached. Furthermore, the bottom plate 11 has a bottom hole 15 centrally located and around which an annular stem 16 extends downwardly from the bottom plate 11. The annular stem 16 has bottom external threads 17 that mechanically mate with internal threads in the opening 210 located on the top of the swimming pool filter 200.

Figure 4A:
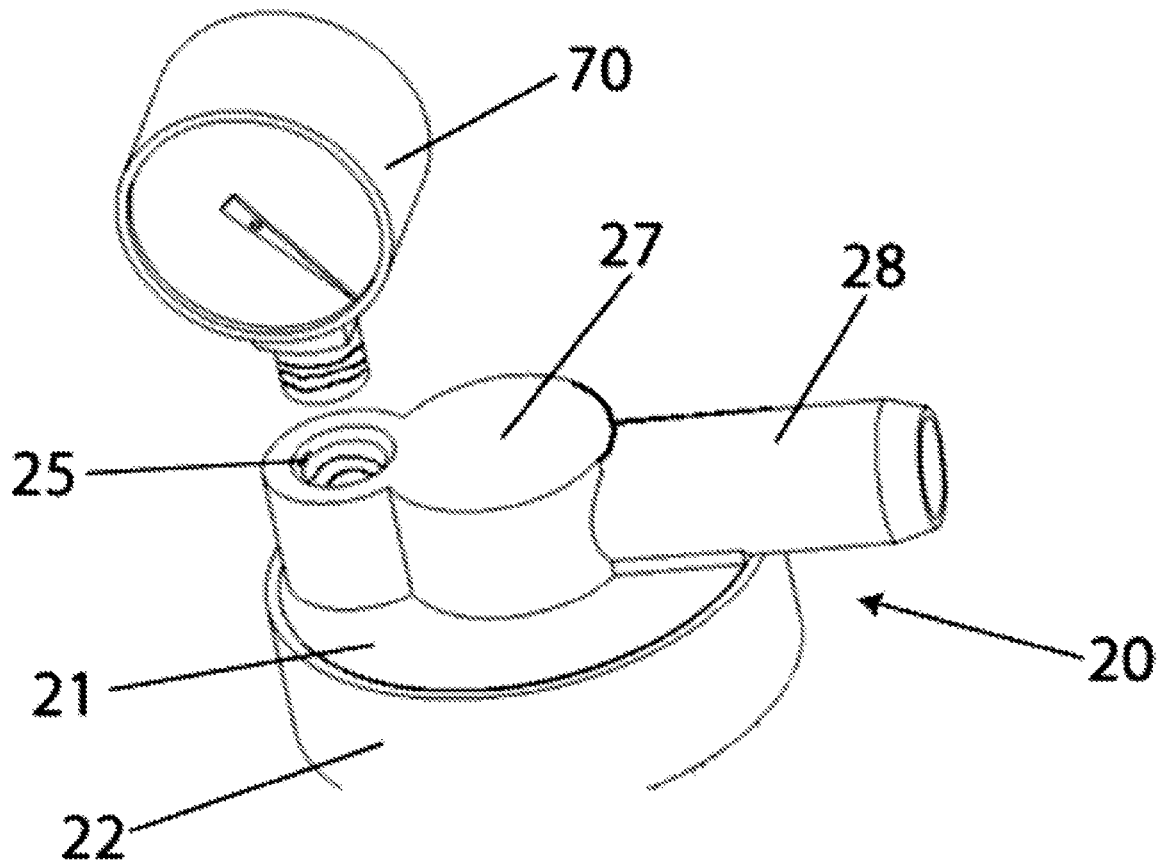
FIGS. 4a and 4b is a perspective view of the top cover of the present invention.
Figure 4B:
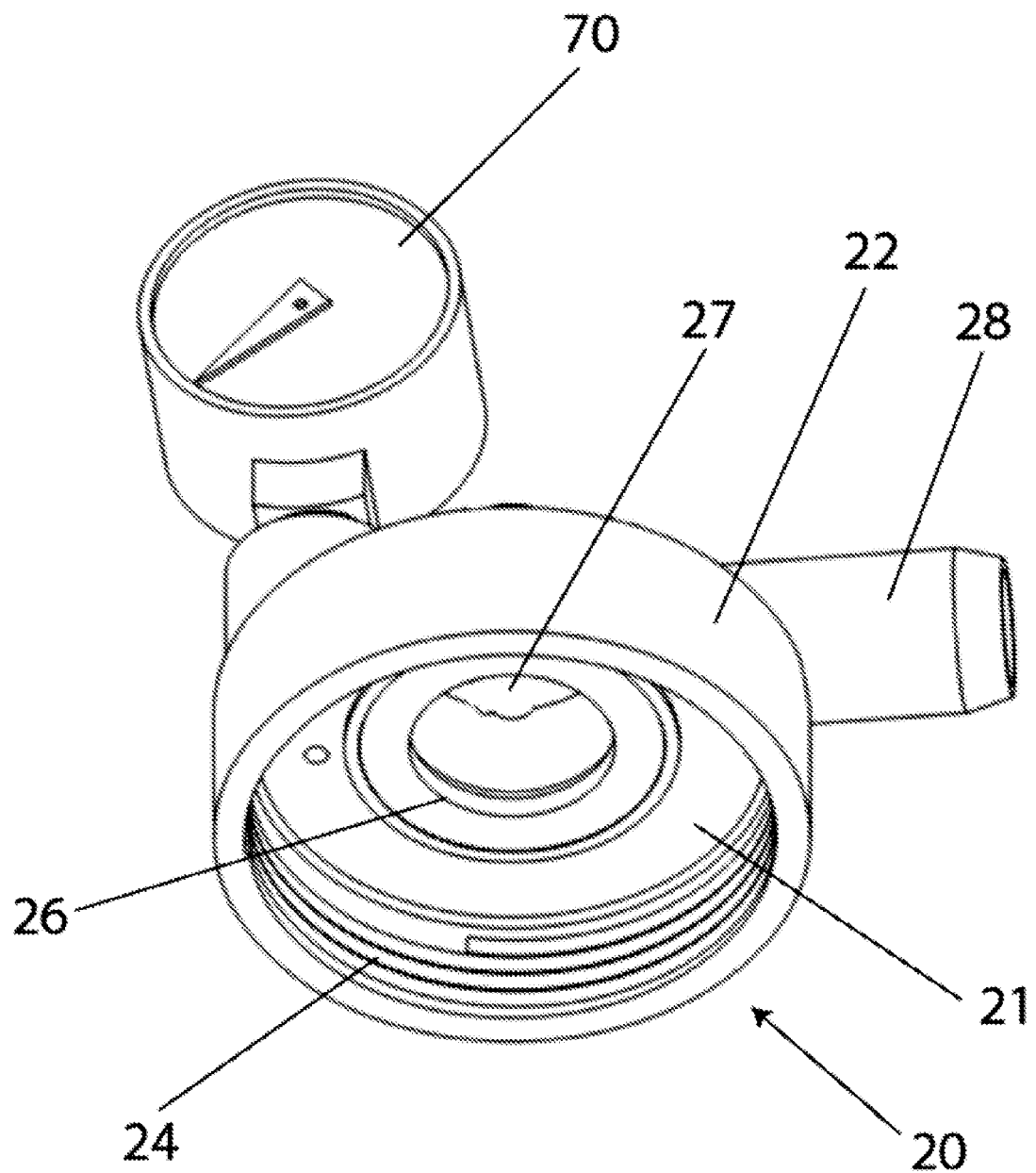

On the other hand, as shown in FIGS. 4a and 4b, the top cover 20 of the air evacuation apparatus 100 of the present invention has a top plate 21 from which an annular sidewall 22 extends downwardly. The annular sidewall 22 has internal threads 24 molded toward the bottom end which mate with the top external threads 14 of the valve body 10. Additionally, the top plate 21 has a gauge hole 25 into which a pressure gauge 70 is attached. Furthermore, the top plate 21 has an exhaust hole 26 that is centrally located and leads into an exhaust chamber 27 that protrudes upwardly from the top plate 21. An exhaust tube 28 then extends sideways from the exhaust chamber 27 and above the top plate 21.

Figure 5:
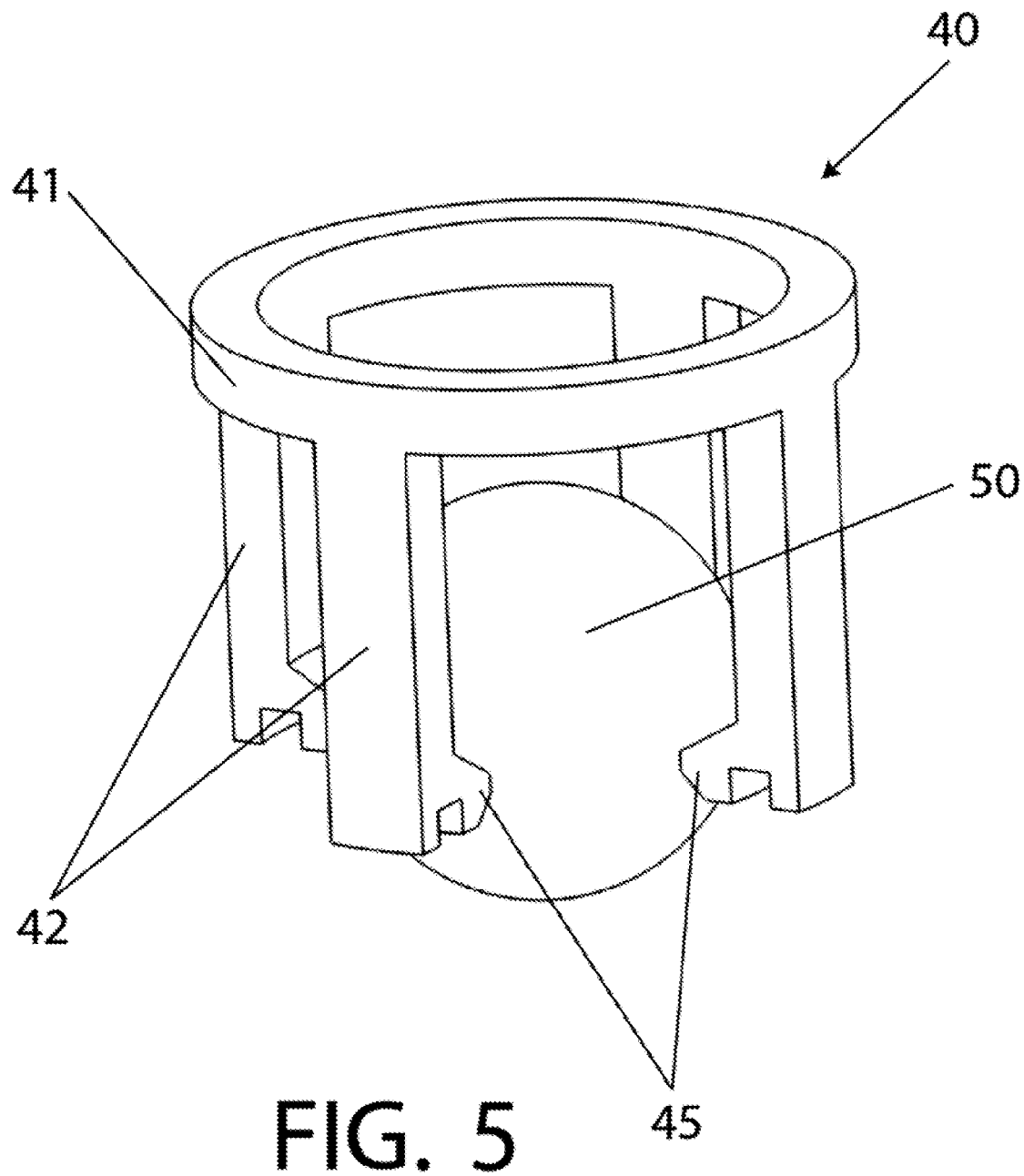
FIG. 5 is a perspective view of the ball retainer of the present invention.

As shown in FIG. 5, the ball retainer 40 is a plastic part with a top ring 41 and a plurality of downwardly protruding extensions 42, each of which have a nub 45 at the lowermost end. The plurality of the downwardly protruding extensions 42 are spaced a sufficient distance apart to retain the lower ball 50 captive therewithin. Furthermore, the nubs 45 at the lowermost end of each downwardly protruding extension 42 protrude inward so as to reduce the space between them to less than the outside diameter of the lower ball 50. As such, the lower ball 50 can be inserted into the ball retainer 40 and held captive within the downwardly protruding extensions 42 by the nubs 45 which prevent the lower ball 50 from falling through the bottom end of the ball retainer 40. As shown in FIG. 5, the nubs 45 allow the lower ball 50 to be retained captive within the ball retainer 40 but with the bottom section of the lower ball 50 extending past the bottom end of the ball retainer 40.

Figure 6A:
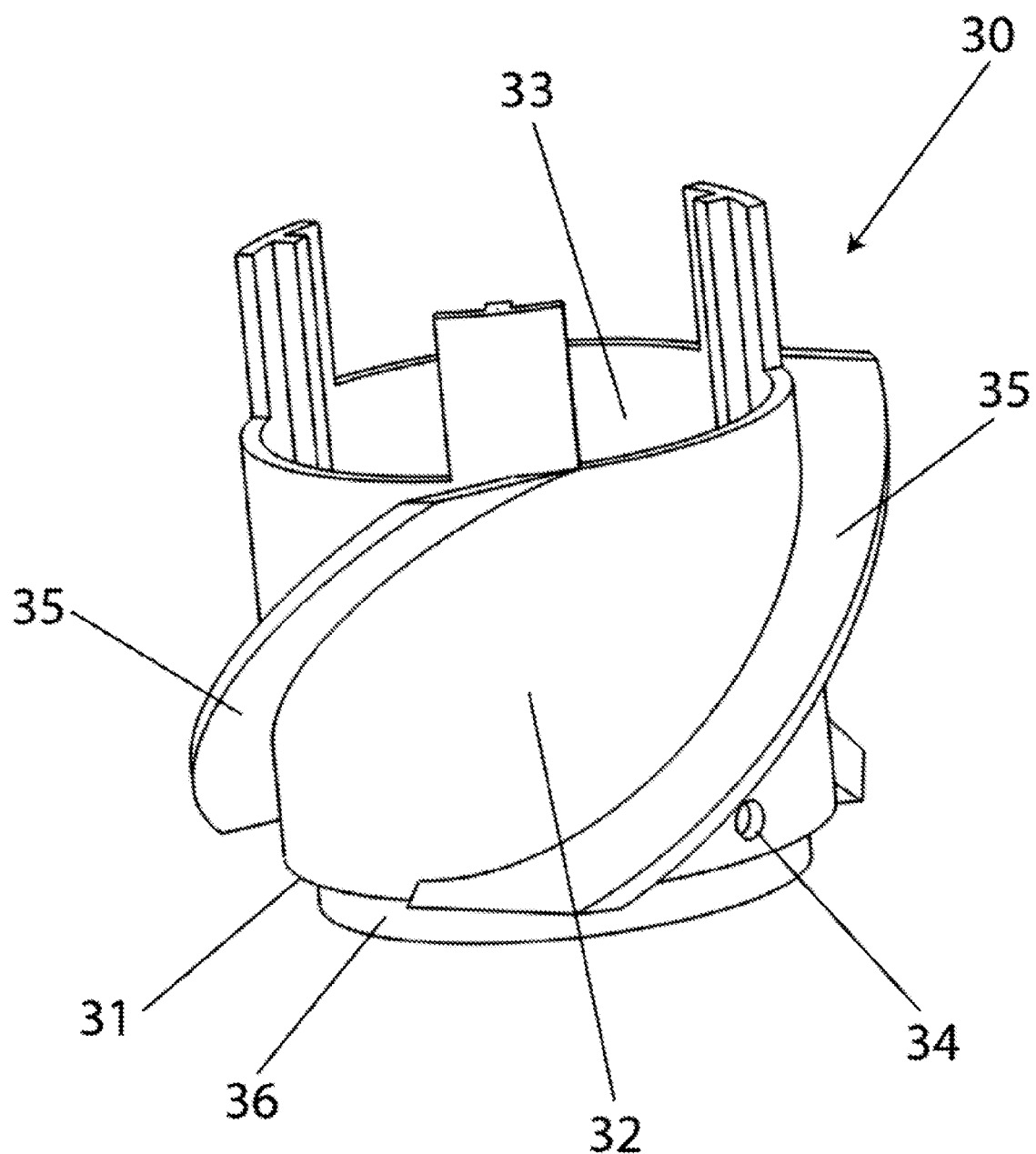
FIGS. 6a and 6b is a perspective view of the upper ball shield of the present invention.
Figure 6B:
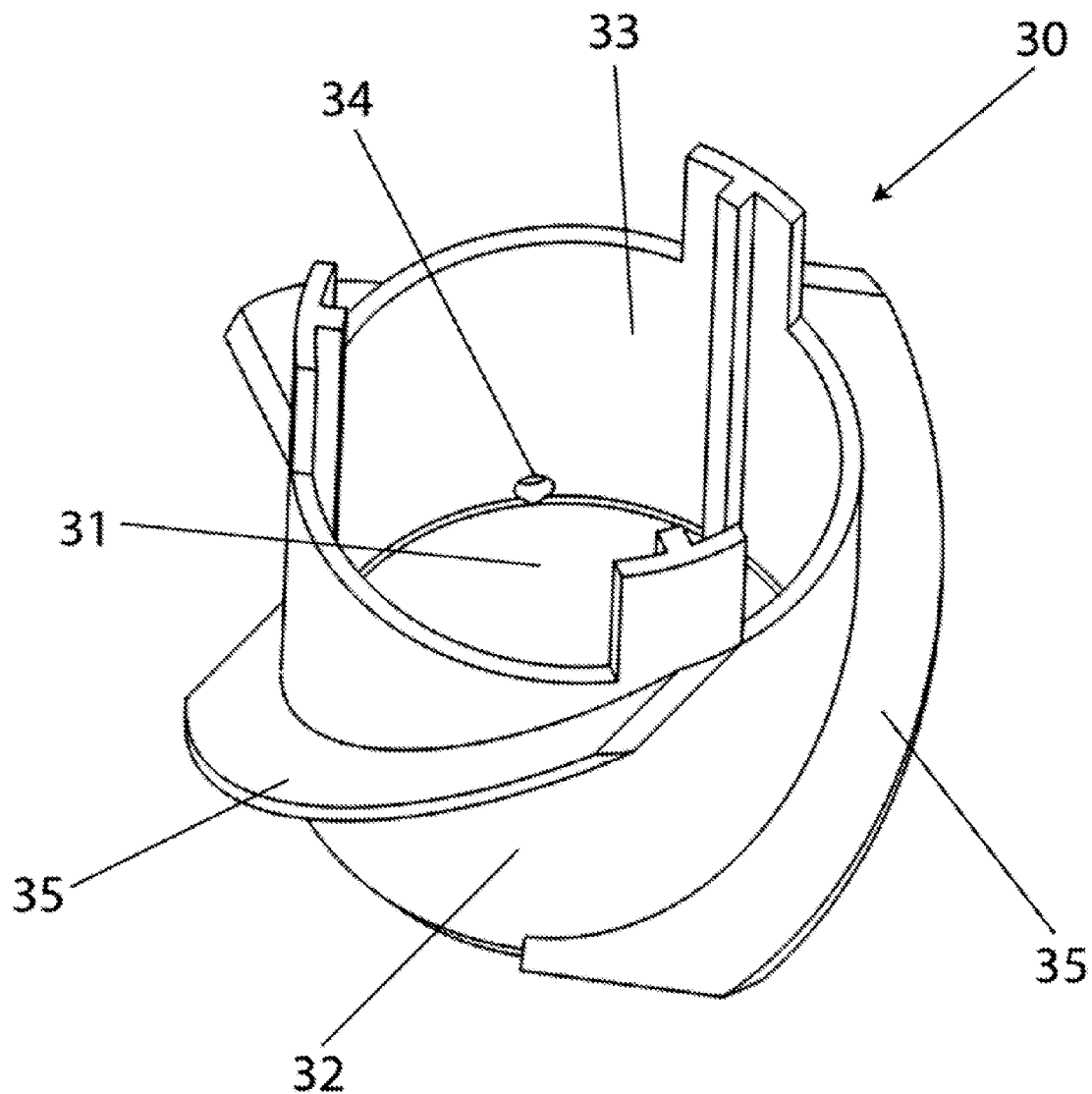

As shown in FIGS. 6a and 6b, the upper ball shield 30 has a plate 31 from which an annular sidewall 32 extends upwardly to define an upwardly open cavity 33. In addition, the annular sidewall 32 has a small hole 34 toward the bottom end. Furthermore, several flaps 35 protrude outwardly perpendicular to the sidewall 32 and extend from the top to the bottom ends of the upper ball shield 30. The inside diameter of the sidewall 32 is slightly greater in size than the outside diameter of the upper ball 60. Thus, the upper ball 60 can be held within the cavity 33 of the upper ball shield 30. In addition, the plate 31 has a ring 36 extending downwardly to which the top ring 41 of the ball retainer 40 is glued or attached.

Finally, the air evacuation apparatus 100 of the present invention has a lower ball 50 and an upper ball 60. Both balls 50 and 60 have a specific gravity less than that of water so that they will float in water and be carried upward by water rising inside the air evacuation apparatus 100.

Hereinafter, an explanation on the methods of assembling the product of the present invention, the installation thereof to a swimming pool filter 200, and the operating states thereof will be given.

Figure 7:
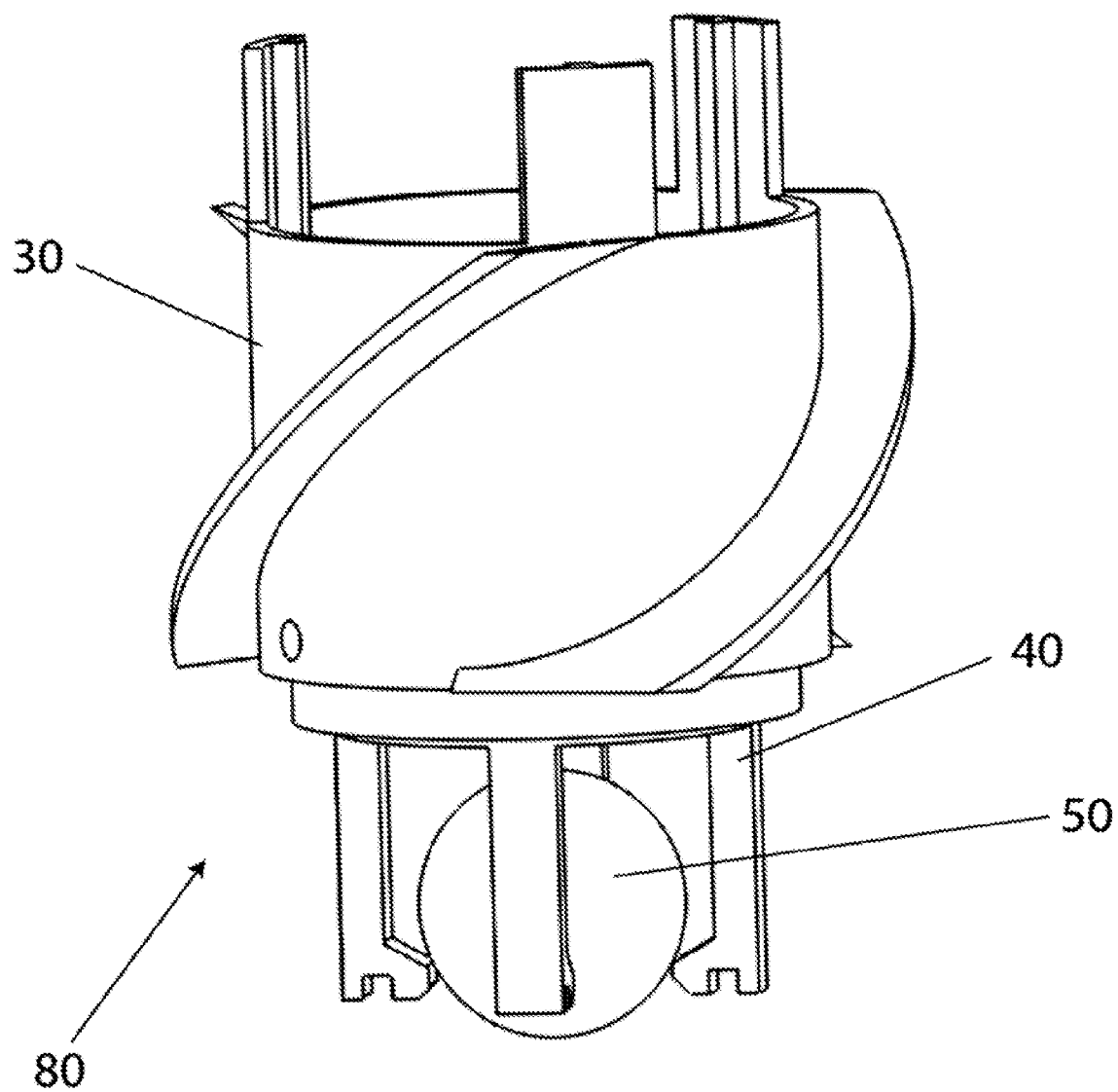
FIG. 7 is a perspective view of the internal assembly of the present invention.

For the assembly of the air evacuation apparatus 100 of the present invention, the top ring 41 of the ball retainer 40 is securely glued or attached to the ring 36 located underneath the plate 31 of the upper ball shield 30. Then the lower ball 50 is pushed into the ball retainer 40 so that it is held captive within the downwardly protruding extensions 42 and resting against the nubs 45. FIG. 7 shows the final configuration of the lower ball 50 retained within the ball retainer 40 that is securely attached to the bottom of the upper ball shield 30. As shown in FIG. 7, the lower ball 50 rests against the nubs 45 within the ball retainer 40 but with its bottom section extending past the bottom end of the ball retainer 40. This assembly, as shown in FIG. 7, of the ball retainer 40 captivating the lower ball 50 and attached to the bottom of the upper ball shield 30 is referred to as the internal assembly 80.

Figure 8:
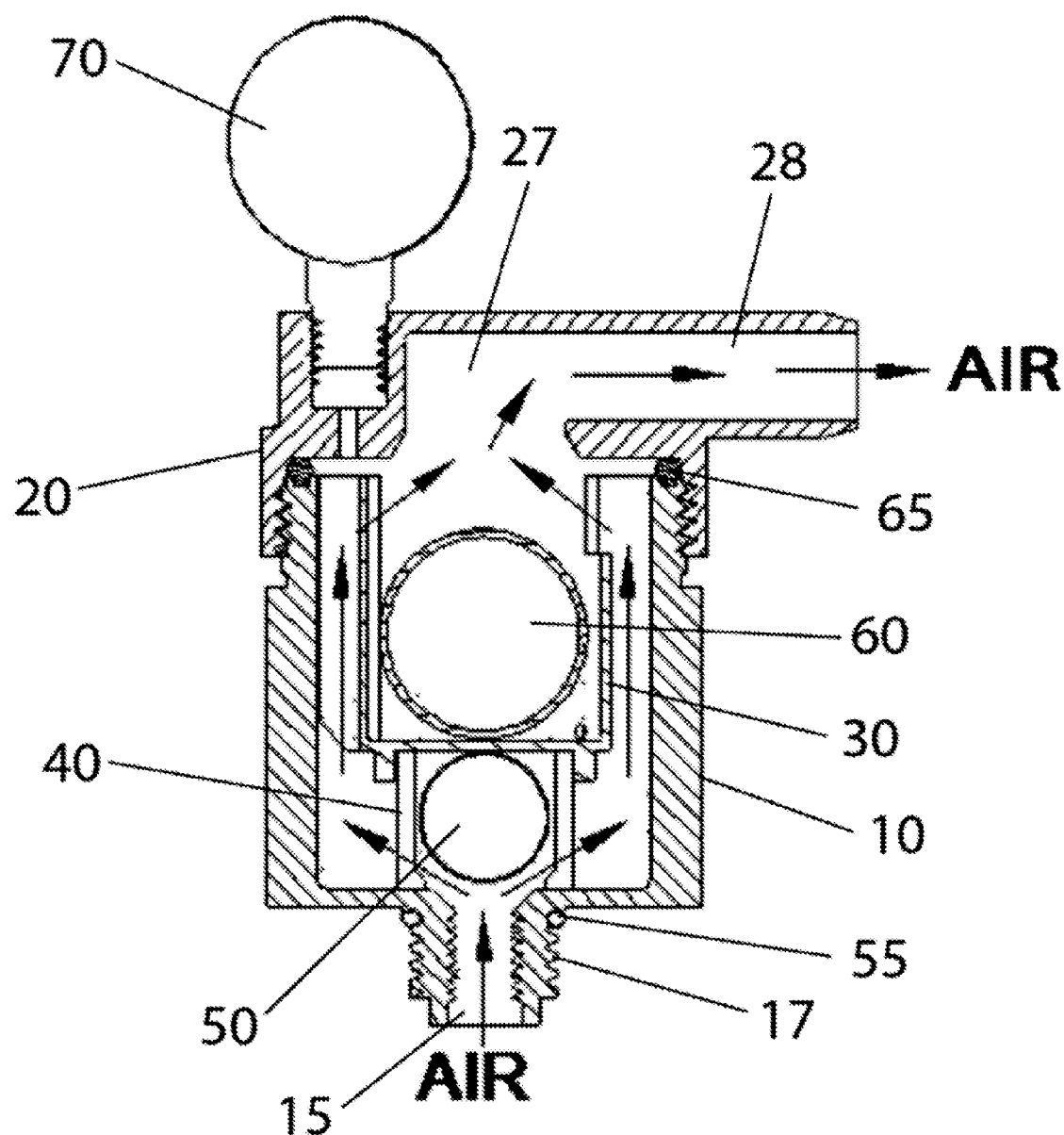
FIG. 8 is a cross sectional view of the air evacuation apparatus of the present invention in its functional state when only air is flowing into the main body from the pool filter. The flow of air is depicted by the arrows.

The internal assembly 80 is then inserted into the upwardly open cavity 13 of the valve body 10 oriented with the ball retainer 40 in the bottom and the upper ball shield 30 in the top, as shown in FIG. 8. The internal assembly 80 is inserted into the valve body 10 until the bottom end of the ball retainer 40 rests against the bottom plate 11 of the valve body 10. The flaps 35 allow the upper ball shield 30 to be spaced from the annular sidewall 12 of the valve body 10 so that the upper ball shield 30 is centrally placed within the cavity 13 of the valve body 10. The flaps 35 also ensure that the lower ball 50 rests directly on top of the centrally located bottom hole 15 of the valve body 10.

Once the internal assembly 80 is properly positioned in the valve body 10, the bottom section of the lower ball 50 will rest on the bottom hole 15 of the valve body 10 so as to block or seal it. In fact, the top edge 18 of the bottom hole 15 in the preferred embodiment of the present invention is chamfered or beveled so as to accommodate a better seal against the lower ball 50. With the internal assembly 80 inside the valve body 10 and the lower ball 50 blocking or sealing the bottom hole 15, the upper ball 60 is dropped into the cavity 33 of the upper ball shield 30. The upper ball 60 is not attached or secured to anything. Rather the upper ball 60 rests freely against the plate 31 and within the sidewall 32 of the upper ball shield 30.

Finally, the top cover 20 is attached to the top end of the valve body 10 using the internal threads 24 of the top cover 20 and the external threads 14 of the valve body 10. To prevent any water leakage into or out of the relief valve 100, a rubber gasket or grommet 65 is used in between the top cover 20 and the valve body 10. Thereafter, a pressure gauge 70 is attached to the gauge hole 25 of the top cover 20.

Figure 12:
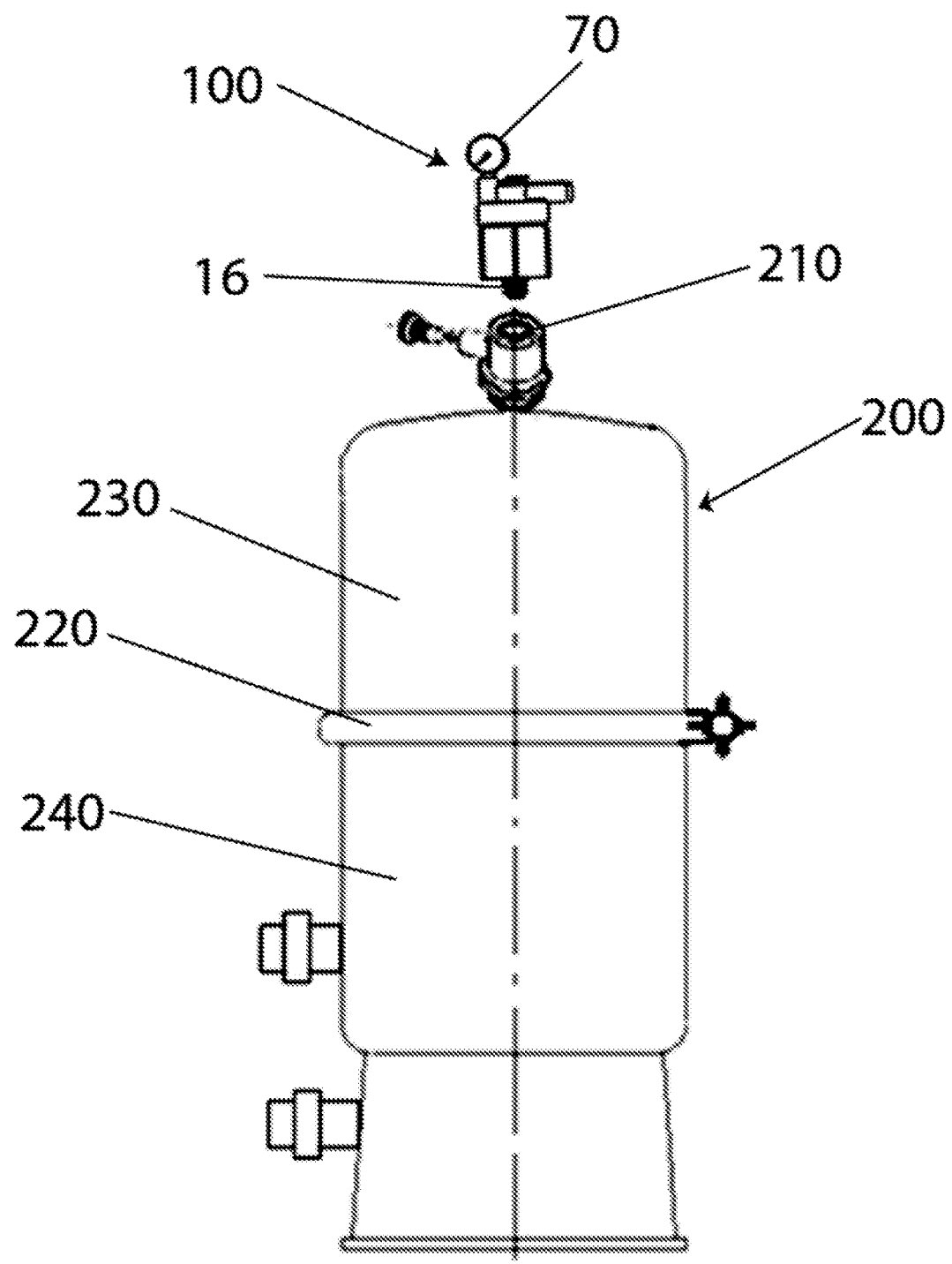
FIG. 12 is a perspective view of the evacuation apparatus of the present invention attached to the top of a swimming pool filter.

The assembly of the air evacuation apparatus 100 of the present invention as discussed above is expected to be completed by the manufacturer prior to the distribution or sale of the air evacuation apparatus 100 to a consumer. Installation of the air evacuation apparatus 100 of the present invention simply requires the attachment of the air evacuation apparatus 100 of the present invention to the top of the swimming pool filter 200, as shown in FIG. 12. This connection is accomplished by inserting the annular stem 16 into the opening 210 at the top of the filter. The interaction between the bottom 10 external threads 17 in the annular stem 16 of the present invention with the internal threads in the opening 210 ensures a proper connection. To further seal or prevent fluid leakage from this connection, a small rubber gasket or grommet is used 55. Thus, the installation of the product of the present invention is simple enough for a typical homeowner to complete without the aid of special tools or a professional.

Once the air evacuation apparatus 100 of the present invention is installed to a swimming pool filter 200, the swimming pool pump is activated to suck water from the swimming pool into the swimming pool filter 200. Initially the pool filter 200 would be filled with air. As the water rises inside the filter 200, the air is pushed above the water. As the water continues to rise, the air is pushed through the opening 210 located on the top of the pool filter 200. Since the annular stem 16 of the air evacuation apparatus 100 of the present invention is connected to the opening 210, the air is pushed through the annular stem 16 and through the bottom hole 15 in the valve body 10. As the air flows through the bottom hole 15, it pushes the lower ball 50 enough to unblock the bottom hole 15 and allow the air to pass through. This occurs because the lower ball 50 is light in weight and simply rests on top of the bottom hole 15 without any obstructions. As the air flows into the valve body 10 of the present invention, it proceeds to flow out through the exhaust hole 26 located on the top cover 20, through the exhaust chamber 27, and out the exhaust tube 28. As the water inside the filter 200 rises and the air is pushed into the valve body 10, the exhaust hole 26 is completely unobstructed, thus allowing the air to escape through the exhaust tube 28.

Once all of the air has been evacuated from the filter 200 and the filter 200 has been tilled with water, the pump will continue pumping water into the filter 200, thus pushing the water, rather than air, into the valve body 10 of the present invention through the opening 210. The water then continues to be pushed passed the lower ball 50 and continues to fill up the cavity 13 of the valve body 10. As the water rises within the valve body 10, it flows into the cavity 33 of the upper ball shield 30. As the water continues to rise in the cavity 33, the upper ball 60 begins to float on the top surface of the water. As such, the upper ball 60 is pushed upward within the upper ball shield 30 by the rising water inside the air evacuation apparatus 100 of the present invention. The rising upper ball 60 is finally directed into the exhaust hole 26 located on the top cover 20 by the annular sidewall 32 of the upper ball shield 30.

Figure 9:
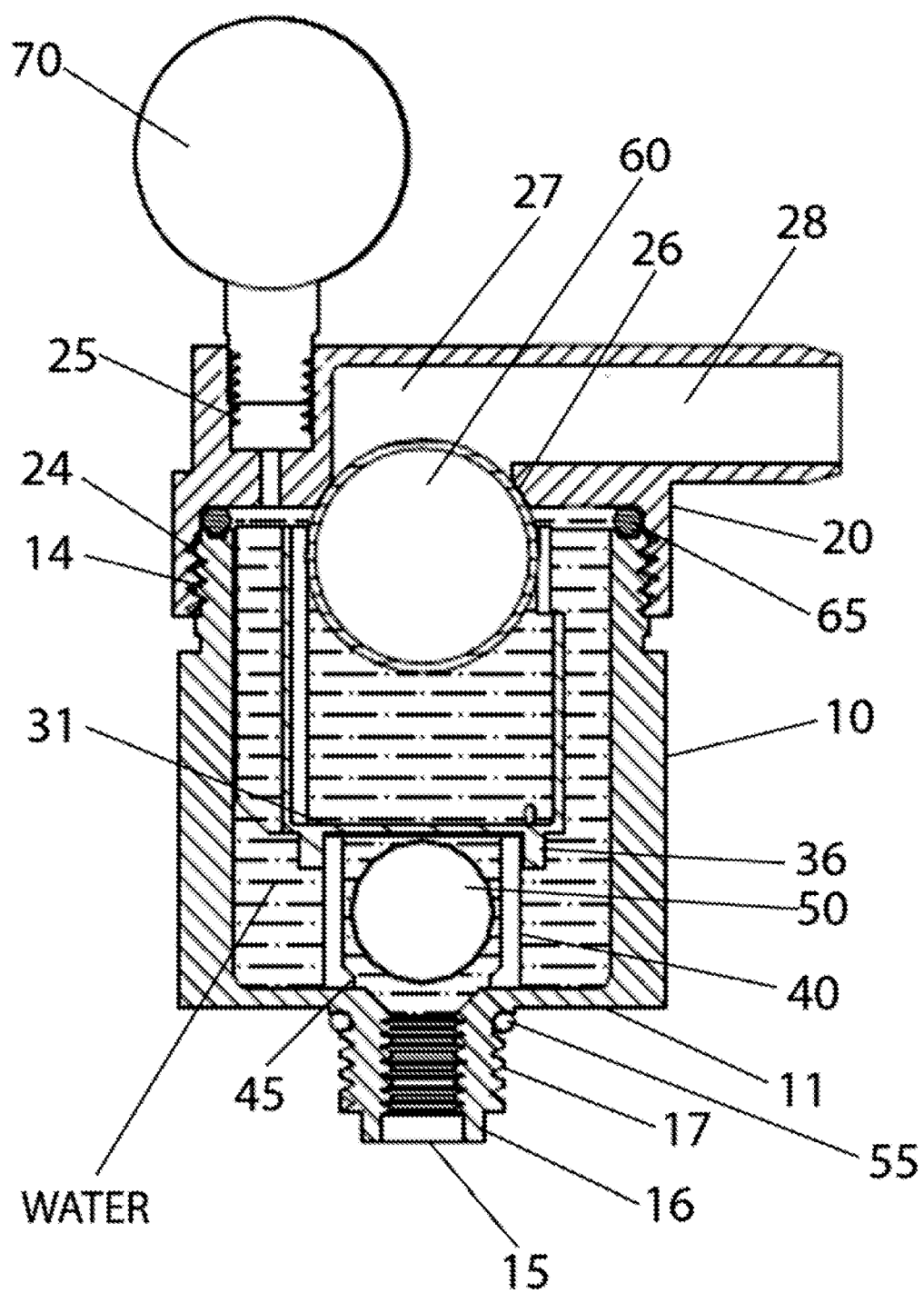
FIG. 9 is a cross sectional view of the air evacuation apparatus of the present invention in its functional state when the water inside the swimming pool filter is compressed and the upper ball blocks or seals the exhaust hole. The dashed lines depict the water.

As shown in FIG. 9, the diameter of the upper ball 60 is larger than the diameter of the exhaust hole 26, therefore, the upper ball 60 cannot be pushed completely through the exhaust hole 26. However, the pressure from the rising water and the buoyancy of the upper ball 60 is sufficient to push the upper ball 60 into the exhaust hole 26 far enough to block or seal it to prevent water from escaping therethrough. Thus, as the water in the air evacuation apparatus 100 rises, the upper ball 60 is forced to block or seal the exhaust hole 26 and prevent the water from escaping. In fact, the bottom edge of the exhaust hole 26 in the preferred embodiment of the present invention is chamfered or beveled so as to accommodate a better seal against the upper ball 60.

With the exhaust hole 26 blocked or sealed, the pump continues its normal operation of pumping water into the filter 200 which leads to the compression of the water and the rapid increase of the internal pressure of the filter 200, as measured by the pressure gauge 70.

Figure 10:
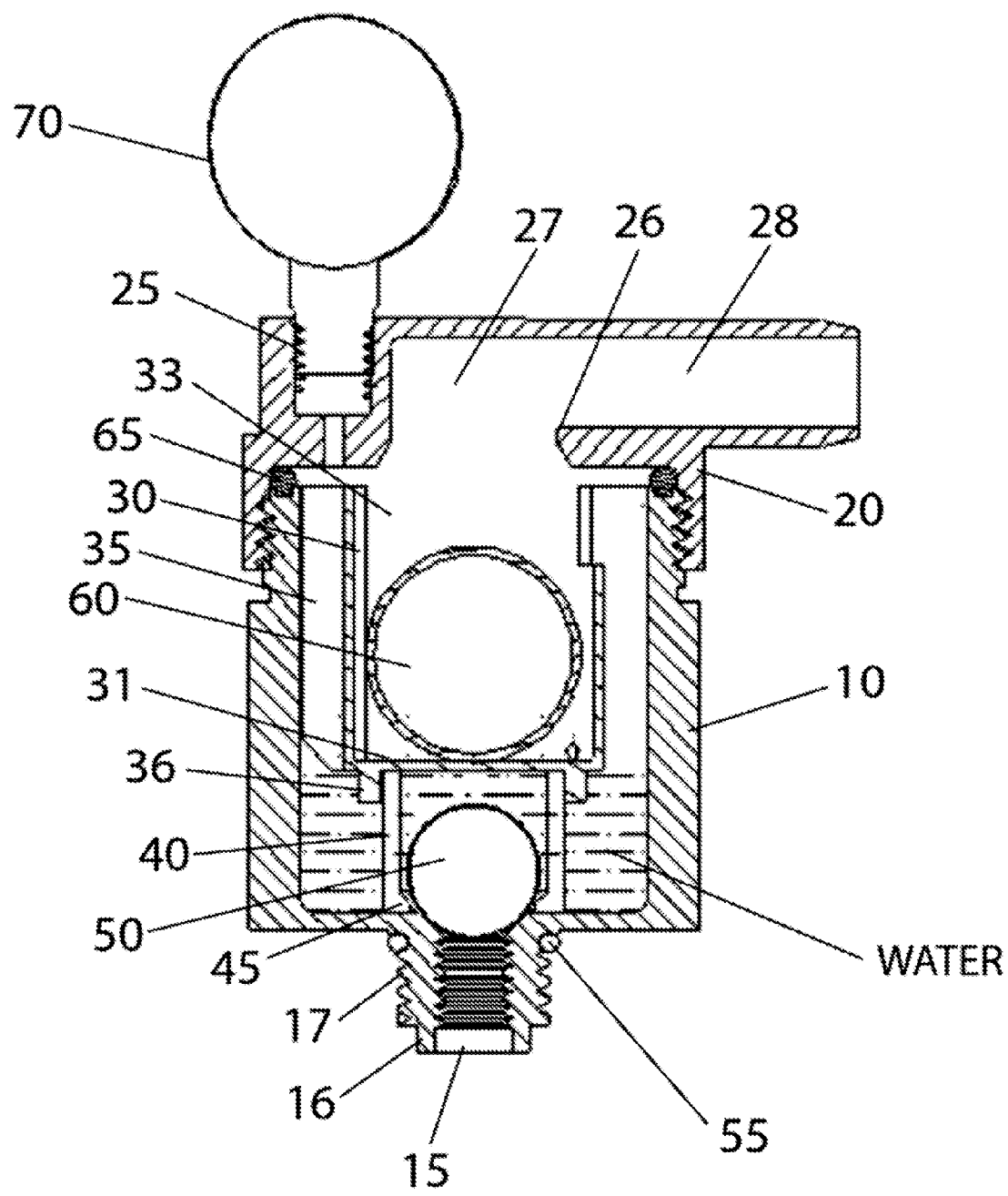
FIG. 10 is a cross sectional view of the air evacuation apparatus of the present invention in its functional state when the swimming pool pump is turned off and the lower ball blocks or seals the bottom hole. The dashed lines depict the water.

When the pump is turned off to stop pumping water into the filter 200, the internal pressure inside the filter 200 inevitably decreases and the water inside the air evacuation apparatus 100 of the present invention recedes. As the water recedes through the small hole 34 and through the bottom hole 15, it flows in a downward direction. This downward water flow drags the lower ball 50 down and into the bottom hole 15 so as to block or seal it to prevent further receding of the water, as shown in FIG. 10. Due to the receding water, the upper ball 60 is pulled down from the exhaust hole 26 a short distance, leaving it unblocked or unsealed. The height of the ball retainer 40 is designed to allow sufficient water to recede before the lower ball 50 blocks or seals the bottom hole 15 such that the upper ball 60 is pulled down a sufficient distance from the exhaust hole 26 to ensure that the exhaust hole 26 is completely unsealed, as shown in FIG. 10.

During the time when the pump is turned off, which are often extended periods of time, a tendency exists for air to leak into the pool filter 200 through faulty connections or cracks in the piping of the circulation system or through other means. The piping of the circulation system is typically made of plastic and the connections are sealed with a liquid solvent. Over time, it is not unusual for cracks to develop within the plastic pipes, fittings, or valves and for the connections to be unsealed by degradation of the liquid solvent. As such, it is not uncommon for several leaks to develop within the circulation system that allow air to leak into the pipes and accumulate within the pool filter 200.

When the pump is turned back on, the pool filter 200 is filled with water again and the water within the pool filter 200 is compressed. Thus, any air entrapped within the filter 200 is also compressed as it has no way to escape when the air evacuation apparatus 100 of the present invention is not used. This results in the potential energy inside the filter 200 being raised to dangerous levels. A slight shift of the two halves 230 and 240 of the filter 200 would unleash the potential energy and cause the filter 200 to separate violently. Thus, the air entrapped within the pool filter 200 poses the greatest risk of causing the violent separation of the filter 200 when the clamp 220 that holds the two halves 230 and 240 of the filter 200 is not properly secured.

However, the accumulation of air inside the pool filter 200 would not occur with the air evacuation apparatus 100 of the present invention. As described above, when the pump is turned off for extended periods of time, air will tend to leak and be entrapped inside the pool filter 200. However, when the pump is turned back on to resume pumping water into the filter 200, the entrapped air will be automatically pushed through the annular stem 16, through the bottom hole 15 in the valve body 10, and past the lower ball 50. Thereafter, the air will be pushed through the exhaust hole 26, through the exhaust chamber 27, and out the exhaust tube 28. When all the entrapped air is pushed out the exhaust tube 28, the water will rise until the upper ball 60 is, once again, pushed to seal the exhaust hole 26. Thus, further pumping of water will lead to the compression of the water in the filter 200. Since the air evacuation apparatus 100 of the present invention evacuates the air inside the filter 200, compression of air that would raise the potential energy to dangerous levels is avoided altogether.

In other words, the air evacuation apparatus 100 ultimately serves a function that is equivalent to the swimming pool owner opening a manual relief valve to relieve any entrapped air inside the filter 200 every time the pump is turned on. The air evacuation apparatus 100 of the present invention automatically relieves air inside the filter 200 every time the pump is turned on.

In the preferred embodiment of the present invention, all of the components, except for gaskets and grommets, are made of plastic for low cost manufacturability and protection against corrosion. It is also important to recognize that the air evacuation apparatus 100 of the present invention must be installed on the top of the pool filter 200, as shown in FIG. 12. This is important because the top of the exhaust hole 26 of the air evacuation apparatus 100 must always be above the highest point of the filter 100. Air has a natural tendency to flow to the highest point in the filter. Thus placing the exhaust hole 26 at the highest point in the filter ensures that air inside the filter 200 will be automatically directed to it.

However, attaching the air evacuation apparatus 100 of the present invention to the top of the filter 200 forces it to be exposed to the unfiltered or dirty water from the swimming pool being pumped into the filter 200 by the pump. The attachment of the air evacuation apparatus 100 to the top of the filter prevents its exposure to the other side of the filter where the water has been filtered and cleaned. Exposure to unfiltered or dirty water forces debris and other contaminants into the air evacuation apparatus 100 of the present invention. Such debris and contaminants can eventually interfere with the functionality of the air evacuation apparatus 100. It is for this reason that the internal assembly 80 is carefully designed to comprise the lower ball 50 retained within the ball retainer 40 that is securely attached to the upper ball shield 30 which has the upper ball 60 resting within its cavity 33. Such configuration allows the air evacuation apparatus 100 of the present invention to be periodically cleaned quickly and easily.

Cleaning the air evacuation apparatus 100 of the present invention is done by simply detaching the top cover 20 from the valve body 10 by unscrewing the internal threads 24 from the external threads 14. Subsequently, the entire internal assembly 80 is removed. As previously discussed, the internal assembly 80 is not attached to the valve body 10 or any other component. The internal assembly 80 simply rests inside the valve body 10 on top of the bottom plate 11. Thus, removing the internal assembly 80 is easy and does not require any tools. With the internal assembly 80 removed, it is cleaned or washed. The lower ball 50 is retained in the ball retainer 40 and the upper ball 60 can be held within the upper ball shield 30 during the cleaning process so that the balls 50 and 60 don't fall off and get lost easily. Finally, with the internal assembly 80 cleaned, it is replaced back into the valve body 10. As discussed above, the internal assembly 80 is self-centered within the valve body 10 by the flaps 35. With the internal assembly 80 inside the valve body 30, the top cover 20 is reattached to the valve body 30 and the air evacuation apparatus 100 of the present invention is ready for resumed use.

Figure 11A:
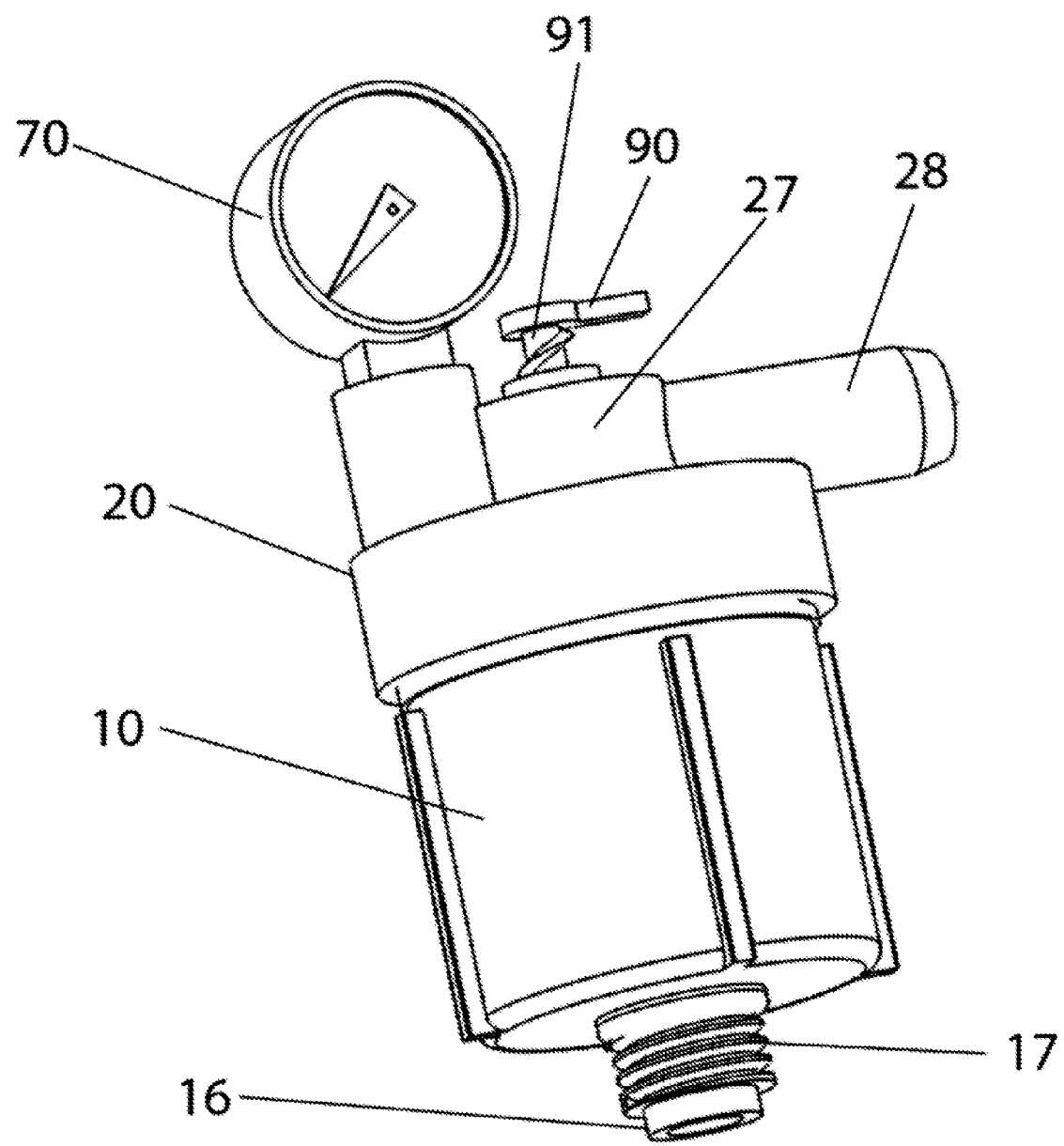
FIG. 11a is a perspective view of the alternate embodiment of the air evacuation apparatus of the present invention having a pin with a shaft that can be displaced downward to unseal the exhaust hole and allow dirty water with debris to flow out form the valve body.
Figure 11B:
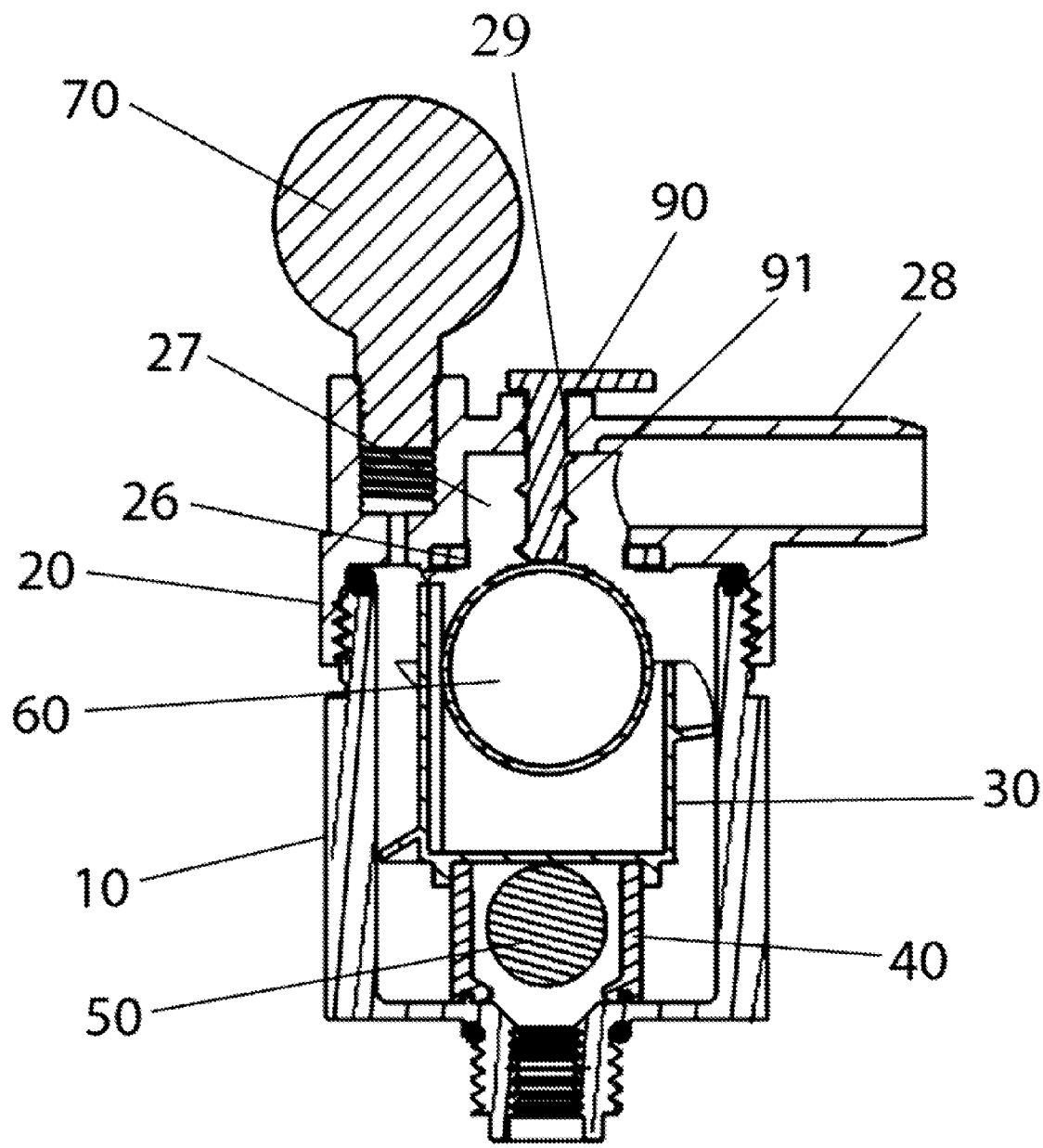
FIG. 11b is a cross sectional view of the alternate embodiment of the air evacuation apparatus of the present invention having a pin with a shaft that can be displaced downward to unseal the exhaust hole and allow dirty water with debris to flow out from the valve body.

However, to facilitate the evacuation apparatus 100 of the present invention to be partially cleaned without removing the top cover 20, an alternative embodiment of the present invention has a pin 90 with a shaft 91 that extends downward through the exhaust chamber 27, as shown in FIGS. 11a and 11b. The pin 90 is inserted through a pin hole 29 that is centrally located on the top cover 20. During normal operation of the evacuation apparatus 100 of the present invention, the pin 90 is in a top position with the lowermost point of the shaft 91 within the exhaust chamber 27. But when the evacuation apparatus 100 needs to be partially cleaned, the pin 90 is displaced downwardly until the lowermost point of the shaft 91 is passed through the exhaust hole 26 and into the valve body 10. As the pin 90 is displaced downwardly, it pushes the upper ball 60 down to unseal or unblock the exhaust hole 26. This unsealing of the exhaust hole 26 allows dirty water with debris to flow out from the valve body 10 through the exhaust tube 28. The outflow of dirty water through the exhaust tube 28 facilitates the removal of some debris and contaminants from the valve body 10. This allows the evacuation apparatus 100 of the present invention to be partially cleaned without removing the top cover 20.

The attachment of the pin 90 to the top cover 20 is preferably done with threads that allow the pin 90 to be screwed up and down so as to displace the lowermost point of the shaft 91 accordingly. Alternatively, the pin 90 can be attached as a push pin with a spring. This configuration would allow the pin 90 to be pushed down against the tension of the spring to displace the lowermost point of the shaft 91.

To further facilitate the removal of debris and contaminants from the evacuation apparatus 100 of the present invention without removing the top cover 20, the multiple flaps 35 that extend from the top to the bottom ends of the upper ball shield 30 are positioned at an angle, as shown in FIG. 6a. By having the multiple flaps 35 extend at an angle, the upper ball shield 30 is forced to rotate as the water within the valve body 10 raises or is pushed upward. The rising water within the valve body 10 exerts a vertical force against the flaps 35. The angularity of the flaps 35 allows the vertical force of the rising water to spin or rotate the upper ball shield 30. The rotation of the upper ball shield 30 agitates the water inside the valve body 10 and facilitates the removal of some debris and contaminants by the outflowing water. Debris or contaminants that settle within the valve body 10 can trap the upper ball 60 and/or the lower ball 50, or, at least, prevent them from moving to seal the exhaust hole 26 and/or the bottom hole 15, respectively. The rotation of the upper ball shield 30 allows debris and contaminants to be untrapped and removed from the valve body 10 by the outflowing water.

As such, the preferred embodiment of the present invention has multiple flaps 35 that are angled with the lowermost points being to the left of the uppermost points. This allows the upper ball shield 30 to spin or rotate in a direction that directs the water into the exhaust tube 28.

The preferred embodiment of the present invention will function properly as described above. However, some swimming pool owners may still prefer to have the ability to manually relieve air from the filter 200 on a periodic basis, despite the automatic air evacuation offered by the present invention. For this reason, swimming pool owners can periodically displace the pin 90 downward to unseal or unblock the exhaust hole 26 and allow any trapped air to be released or evacuated from the filter.

It is understood that the described embodiments of the present invention are illustrative only, and that modifications thereof may occur to those skilled in the art. Accordingly, this invention is not to be regarded as limited to the embodiments disclosed, but to be limited only as defined by the appended claims herein.

What is claimed is:

1. An automatic air evacuation apparatus attached to a swimming pool or spa filter having an interior comprising:
    a valve body having a cavity, a top end, and a bottom hole that is in communication with said interior of said swimming pool or spa filter;
    an internal assembly comprising a ball retainer attached to an upper ball shield;
    a lower ball that is within said ball retainer;
    an upper ball that is within said upper ball shield;
    a top cover attached to said top end of said valve body and having an exhaust hole;
    wherein said upper ball shield comprising an annular sidewall with a plurality of flaps protruding outwardly therefrom that align said internal assembly within said cavity such that said lower ball sits directly on top of said bottom hole;

wherein said internal assembly sits within said cavity with said lower ball sitting on said bottom hole:

whereby said lower ball is pushed upward by air flowing from said interior of said swimming pool or spa filter into said cavity through said bottom hole;

whereby said upper ball is pushed upward by water flowing from said interior of said swimming pool or spa filter into said cavity through said bottom hole until said upper ball seals said exhaust hole; and whereby said water flowing from said cavity back into said swimming pool or spa filter forces said lower ball to seal said bottom hole and said upper ball to unseal said exhaust hole.

2. The automatic air evacuation apparatus of claim 1 wherein said plurality of flaps are angled such that said water flowing upward promotes rotation of said upper ball shield by pushing against said flaps.

3. The automatic air evacuation apparatus of claim 1 wherein said upper ball shield further comprises a plurality of small holes in said annular sidewall that promotes the flow of water within said upper ball shield out to said cavity.

* * * * *